United States Patent [19]
Lopresti et al.

[11] Patent Number: 6,115,508
[45] Date of Patent: Sep. 5, 2000

[54] CLOCK FREE TWO-DIMENSIONAL BARCODE AND METHOD FOR PRINTING AND READING THE SAME

[75] Inventors: Daniel P. Lopresti, Hopewell; Jeffrey Esakov, Hamilton Square; Jiangying Zhou, Plainsboro, all of N.J.

[73] Assignee: Matsushita Electric Industrial Co., Ltd., Japan

[21] Appl. No.: 09/134,327

[22] Filed: Aug. 14, 1998

Related U.S. Application Data

[63] Continuation of application No. 08/569,280, Dec. 8, 1995.

[51] Int. Cl.[7] .............. G06K 9/54; G06K 7/10; G09C 3/00
[52] U.S. Cl. .............. 382/306; 380/54; 235/456
[58] Field of Search .................. 382/232, 306; 235/462, 494, 456, 454, 487; 380/49, 54, 18, 51, 55, 30, 23; 358/403

[56] References Cited

U.S. PATENT DOCUMENTS

| | | | |
|---|---|---|---|
| 4,447,903 | 5/1984 | Sewerinson | 371/68.2 |
| 4,754,127 | 6/1988 | Brass et al. | 235/456 |
| 5,337,362 | 8/1994 | Gormish et al. | 380/54 |

*Primary Examiner*—Thomas D. Lee
*Assistant Examiner*—Wenpeng Chen
*Attorney, Agent, or Firm*—Amster, Rothstein & Ebenstein

[57] ABSTRACT

Inventive two-dimensional barcodes, each having encoded digital information in a bitmap representing preferably randomized encoded data bits, are printed onto a printed medium. The bitmap may further include a plurality of block identifiers, spaced a predetermined number of encoded data bits apart, which are used to make corrections for missing or added data bits when the barcode is decoded. Upon decoding a barcode printed on the printed media, the digital information is scanned and the number of horizontal and vertical edges in each respective column and row of the barcode are determined. An edge is determined by selecting a pixel and determining if the two pixels adjacent to the selected pixel are of different colors. After all of the edges are counted, selected groups of columns and rows are analyzed to determine local minimas in the number of counted horizontal and vertical edges in each selected group which provide the column and row center line for each selected group. Thereafter, the binary data located at the intersection of each column and row center line are read out to produce a signal representative of the encoded digital information in the printed barcode.

12 Claims, 6 Drawing Sheets

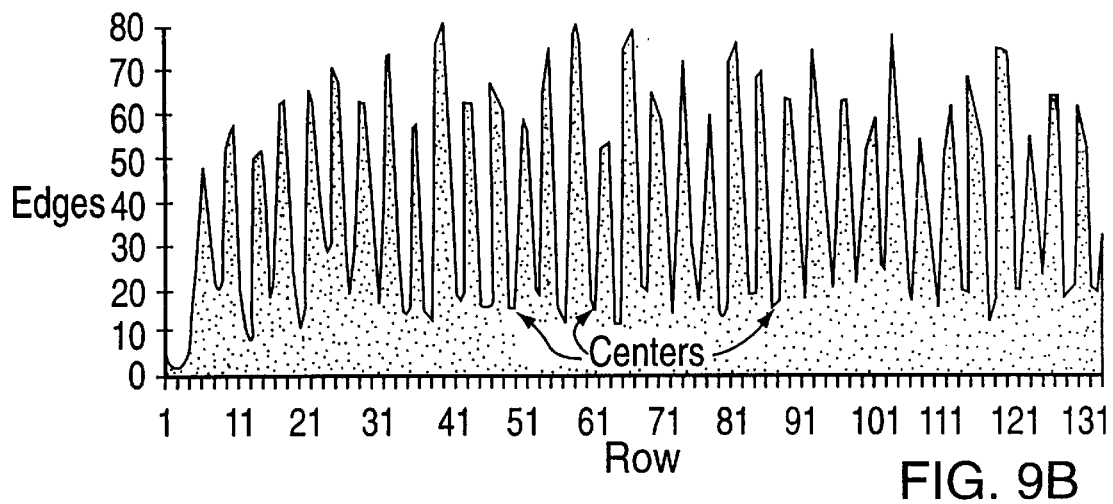
FIG. 9B
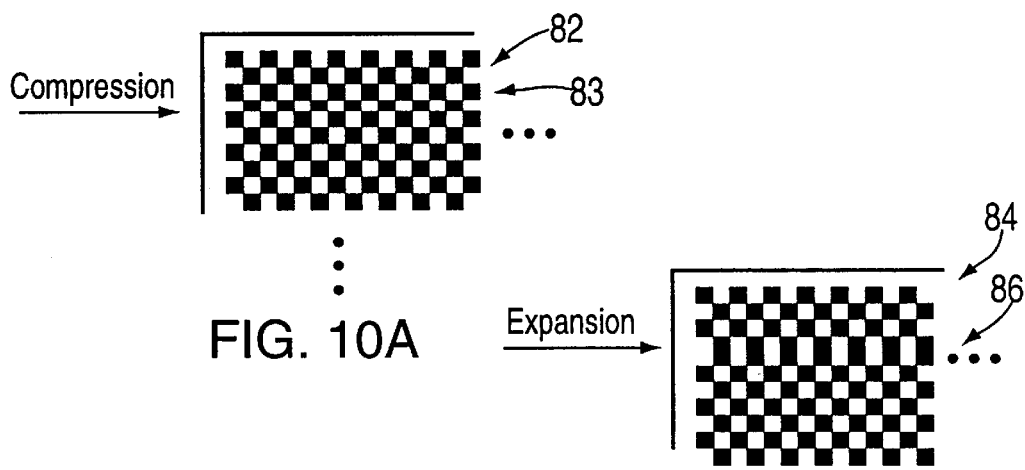
FIG. 10A
FIG. 10B
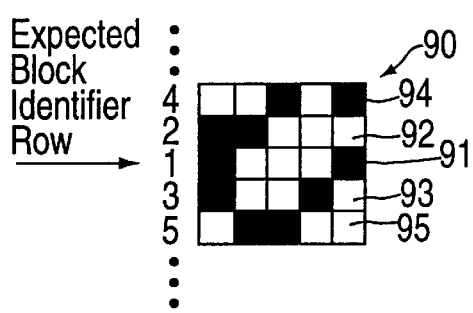
FIG. 11
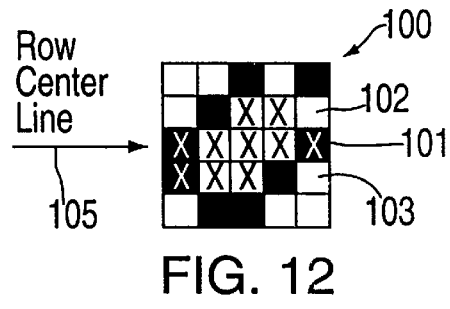
FIG. 12

CLOCK FREE TWO-DIMENSIONAL BARCODE AND METHOD FOR PRINTING AND READING THE SAME

This application is a continuation of Ser. No. 08/569,280 filed Dec. 8, 1995.

FIELD OF THE INVENTION

The invention relates generally to two-dimensional barcodes, and, more particularly, to a robust clock free two-dimensional barcode symbology, encoding information formatted in such barcode symbology, printing the barcode symbology onto a printed medium, and decoding the same.

BACKGROUND OF THE INVENTION

Contrary to the frequent predictions that we will one day live in a "paperless society", paper, and other printed mediums, are playing an increasingly important role as an inexpensive, effective and convenient means for communication. A fundamental limitation with paper, however, is that from a computer standpoint, it is currently an output-only format. While paper may be the preferred medium for displaying information for human use, it is difficult, if not impossible, for a computer to recover data reliably once it has been printed. Optical character recognition (OCR) attempts to solve this problem in a relatively simple domain, such as text rendered using standard fonts, but has met with only limited success thus far. While accuracy rates of ninety-nine (99%) percent are perhaps achievable and may seem impressive, a page with 3,000 characters will still incur an average of thirty (30) OCR errors and hence requires expensive and time consuming manual post-processing.

Another approach uses computer readable barcodes which may be included directly on paper (or other printed medium such as microfilm). Once encoded, such barcodes can be used by the computer to recover information evident to the human reader but difficult for a computer to recognize (e.g., printed text), information implicit to the creation of page but essentially invisible to the human reader (e.g., spreadsheet formulas), or any other information desired, whether or not dependent on the actual character text on the paper.

Computer readable barcodes, wherein digital data is recorded directly on paper, are known and have been utilized to provide document or product identification given a fixed set of values using simple numeric encoding and scanning technologies. Document or product identification systems which have been employed in the past include barcode markers and scanners which have found use in a wide range of arenas. With respect to paper documents, special marks or patterns in the paper have been used to provide information to a related piece of equipment, for example the job control sheet for image processing as taught by Hikawa in U.S. Pat. No. 5,051,779. Similarly, identifying marks comprising encoded information have been printed on the face of preprinted forms as described in U.S. Pat. No. 5,060,980 to Johnson, et al. The Johnson, et al. system provides for a user entering handdrawn information in the fields on a paper copy of the form and then scanning the form to provide insertions to the fields in the duplicate form that is stored electronically in the computer. Still another system is described in U.S. Pat. No. 5,091,966 of Bloomberg, et al., which teach the decoding of glyph shape codes, which codes are digitally encoded data on paper. The identifying codes can be read by a computer and thereby facilitate computer handling of the document, such as identifying, retrieving and transmitting such document.

Besides the various shaped barcodes described above, two-dimensional barcodes called "data strips" having a plurality of rows of "data lines" that represent information digitally encoded on printed media are also known in the art. Each data line row consists of a series of black and white pixels each representing binary "0"s and "1"s. The ordering of the bits in each row determines the digital data stored therein. The data stored within the totality of the rows define the data contained in the two-dimensional barcode. Typically, to read the barcode, the user passes a hand scanner, which simultaneously reads the information in each data line row, vertically along the length of the barcode to read all of the data line rows.

An example of a prior art system using a data strip two-dimensional barcode having rows of data lines with paper media, is found in U.S. Pat. Nos. 4,692,603, 4,754,127 and 4,782,221 of Brass, et al. In this system, two-dimensional barcodes consist of data line rows which are used to encode computer programs and data on paper and are scanned by use of a hand scanner. In addition to encoding the computer programs and data, these data lines also contain tracking and synchronization bits, hereinafter referred to as "clock bits". The requirement for use of numerous clock bits directly within each data line row, significantly reduces the amount of digital data that can be stored within each row. Further, if data line rows having clock bits are damaged, which is common if such barcodes are photocopied or transmitted by facsimile systems, such clock bits would be lost making it difficult, if not impossible, to decode the information encoded in the barcode.

U.S. Pat. No. 5,083,214 of Knowles describes a two-dimensional barcode system that also requires embedding clock bits within the encoded data itself. However, instead of encoding every row and column of data with synchronization and clock bits, the Knowles '214 Patent uses the uppermost row in a data barcode to provide synchronization during scanning. Further, the first eight left most columns of bits comprise clock bits that are used for establishing the clocks to read the data bits contained in each row. Since the uppermost row and all eight left-most columns of the two-dimensional barcode, described in the Knowles '214 Patent, are used solely for synchronization and clocking, the overall data capacity of the barcode is proportionally decreased. Furthermore, if the uppermost row or left most columns of the barcode are damaged, clock information will be lost making it difficult, if not impossible, to read out the data encoded in each data row as with other prior art systems.

It is therefore an object of the present invention to provide a clock free two-dimensional barcode representing digitally encoded data.

Another object of the invention is to provide a clock free two-dimensional barcode printed on a printed medium that is sufficiently robust to withstand damage to the medium.

A further object of the invention is to provide a clock free two-dimensional barcode having pixels representing randomized data bits to prevent long strings of contiguous pixels from being the same color and to provide security from unauthorized decoding.

It is yet another object of the invention to include block identifiers in the clock free two-dimensional barcode to determine whether rows or columns of data are duplicated or missing and to correct errors.

An additional object of this invention is to encode information formatted in a clock free two-dimensional barcode for printing on a printed medium.

It is yet an additional object of this invention to provide a method of decoding information digitally encoded in the form of a clock free two-dimensional barcode printed on a printed medium.

Various other objects, advantages and features of the present invention will become readily apparent from the ensuing detailed description and the novel features will be particularly pointed out in the appended claims.

SUMMARY OF THE INVENTION

These and other objectives are realized by a two-dimensional data barcode having encoded digital information in a bitmap formatted representation of randomized data bits having a selected pixel row and column length.

In another embodiment of this invention, a two-dimensional data barcode has encoded digital information in a bitmap formatted representation having a selected pixel row and column length. The bitmap includes a plurality of block identifiers having predetermined values and positioned at predetermined locations so that each block identifier is spaced a predetermined number of rows or columns apart. Such block identifiers are used to automatically correct information decoded from the barcode if the number of rows or columns between two sequential block identifiers in the decoded information does not equal the predetermined number of rows or columns between those block identifiers.

As a further aspect of this invention, a method of encoding information for printing on a printed medium, such as paper, is described. Information is first converted into a data stream having a sequence of binary characters representing data bits. The data stream is then randomized to produce approximately an equal number of "0" and "1" characters. Thereafter, the randomized data stream is formatted into a two-dimensional bitmap of rows and columns and printed onto the printed medium.

In another embodiment of this aspect of the invention, information is converted into a data stream having binary characters representing data bits. The data stream is mapped to produce digital data bits arranged in a two-dimensional bitmap of rows and columns having predetermined vacant locations. Digital block identifiers are inserted into the previously vacant locations in the bitmap. Each digital block identifier has a predetermined number of block identifier bits which represent a predetermined value to permit each digital block identifier to be recognized so that the number of rows or columns between the digital block identifiers can be counted to ensure that any additional or missing rows or columns can be detected. This digital two-dimensional bitmap is formatted to produce a pixel based two-dimensional bitmap and is printed onto a printed medium.

Another aspect of this invention relates to a method of decoding information printed on a printed medium in the form of rows and columns of data pixels representing predetermined information. First, the information is read from the printed medium by, for example, scanning the medium, and the horizontal and vertical edges respectively in each column and row are determined. An edge is determined by selecting a pixel and determining if the two pixels adjacent to the selected pixel are of different colors. The horizontal and vertical edges are counted for each column and row. Next, selected groups of columns and rows are analyzed to determine local minimas in the number of counted horizontal and vertical edges in each selected group which provide the column and row center line for each selected group. Thereafter, binary data located at the intersection of each column and row center line are read out to produce a signal representative of the encoded information printed on the printed medium.

Preferably, in all embodiments of the two dimensional barcodes of this invention, the encoded information printed on the printed medium is randomized to safeguard against strings of contiguous pixels being the same color which may occur without randomization.

In another embodiment of this aspect of this invention, information printed on a printed medium in the form of a two-dimensional bitmap of rows and columns of data pixels representing encoded data bits is decoded. The encoded data bits are separated by a plurality of block identifiers for each predetermined number of encoded data bits in the rows and/or columns. The bitmap is scanned from the printed medium and the binary data from the data pixels and block identifiers are read to produce a two-dimensional digital array corresponding to the encoded data bits and block identifiers, respectively. The block identifiers in the digital array are determined. Thereafter, the number of encoded data bits between each plurality of block identifiers are counted and data bits are deleted or added based on whether the number of counted data bits is in excess of or less than the predetermined number of encoded data bits.

BRIEF DESCRIPTION OF THE DRAWINGS

The following detailed description, given by way of example and not intended to limit the present invention solely thereto, will best be understood in conjunction with the accompanying drawings in which:

FIGS. 9A and 9B graphically illustrate how column and row clock centers are determined in accordance with the present invention.

FIGS. 10A and 10B illustrate a barcode having a missing row and an extra row, respectively, in accordance with the present invention.

FIG. 11 illustrates a search order for determining the location of the block identifiers in accordance with the present invention.

FIG. 12 illustrates the addition of a row of information when a missing row has been determined in accordance with the invention.

DETAILED DESCRIPTION OF THE PREFERRED EMBODIMENTS

As fully described in co-pending patent applications entitled "Certifiable Optical Character Recognition" (Ser.

No. 07/958,938, filed Oct. 9, 1992, now abandoned, and Continuation Application Ser. No. 08/223,830, filed Apr. 6, 1994) and "Method and Apparatus For Providing Reproduction of Printed Documents Enhanced Optical Character Recognition" (Ser. No. 08/138,467, filed Oct. 15, 1993), the contents of which are explicitly incorporated by reference herein, information about the contents, layout, generation and retrieval of a document can be encoded by a computer when initially generating the document or upon subsequent computer processing thereof. The encoded document information can then be provided via a data barcode, which is also referred to herein as a "PanaMark"®, generated on the face of a printed version of the document. Advanced encoding and print resolution capabilities presently available can accommodate up to 30,000 bits of information in a single square inch of space. Therefore, as taught by the above-referenced applications, one can theoretically encode the entire document contents, limited only by the amount of space on the document face that one is willing to sacrifice to the PanaMark. A barcode scanner, in conjunction with or wholly separate from an optical page scanner, can scan the PanaMark and provide the information to an associated system equipped with the appropriate recognition and decoding software. The decoded information can then be used by the scanning system to create a new version of the document or to enhance the recognition, reproduction and error correction for the scanned document. To decode the PanaMark, it is not required that such barcode scanner and scanning system know the printing resolution of the PanaMark, provided that the scanning resolution of the scanner is at least as fine as the printing resolution of the PanaMark, so that each individual 1×1 or larger pixel of the PanaMark, representing a logical bit, can be scanned.

The information encoded in the form of a PanaMark can be used to enhance the software tools already used to create paper documents. Examples include word processors, spreadsheets, object-oriented graphics, and multimedia applications, such as voice recording and photographic imaging. These examples will be explained with reference to FIG. 1.

Figure 1:
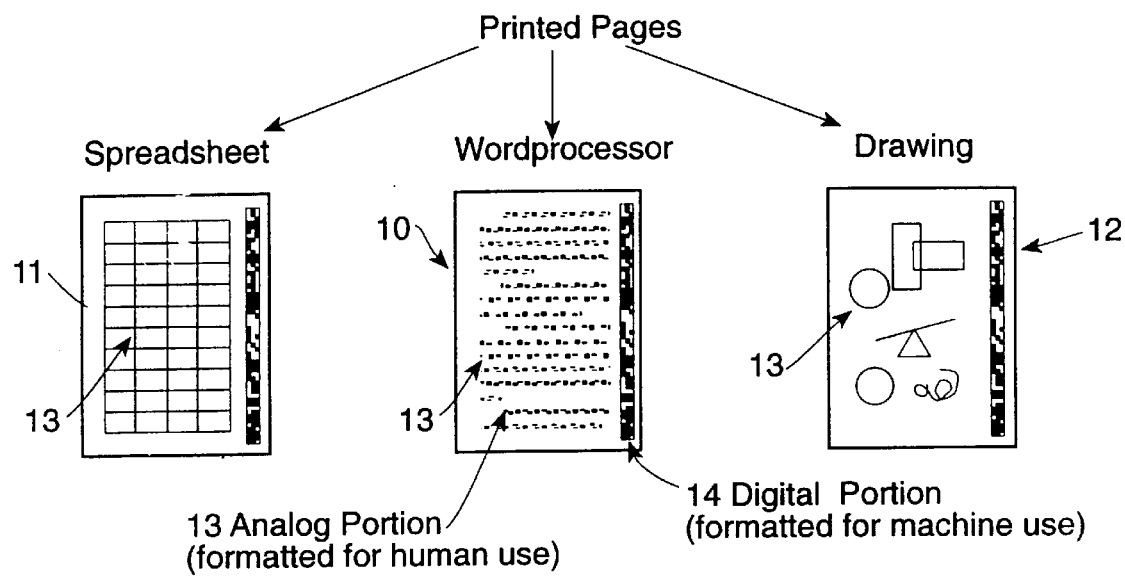
FIG. 1 is a diagram schematically illustrating examples of barcodes printed on a printed medium in accordance with the present invention.

FIG. 1 provides various illustrations of some of the applications for a PanaMark printed on a printed page. Printed page 10 depicts character text generated by a standard word processing program, such as Microsoft® Word 5.1a®. Printed page 11 depicts a spreadsheet generated by a standard spreadsheet program, for example, Microsoft® Excel®. Printed page 12 depicts computer generated graphics generated by a standard graphics program, such as MacDraw Pro 1.5v1®. Each of these printed pages 10–12 include an analog portion 13, such as the character text of page 10, which is easily comprehensible by a human reader and a digital portion 14, which is an example of a data barcode or PanaMark formatted for machine use. The PanaMark 14 of printed page 10, may encode the entire text of the page, and/or other information such as different formatting information so that a text generated by one word processing software, such as Microsoft® Word® can be reformatted to work with another word processing software such as WordPerfect®. PanaMark 14, of printed page 11, may encode the actual text spreadsheet and/or may include formula and formatting information so that a spreadsheet formatted in Microsoft® Excel® may be converted to other spreadsheet software programs, for example, Lotus® spreadsheet. Similarly, PanaMark 14 of printed page 12, may encode information other than the computer generated graphics. Further, it should be noted that any of these PanaMarks 14 may include information completely independent of the analog portions 13. Additionally, PanaMarks 14 may be of any two-dimensional size or shape necessary for aesthetic appearance or necessary to contain the amount of information encoded on the printed page.

Figure 2:
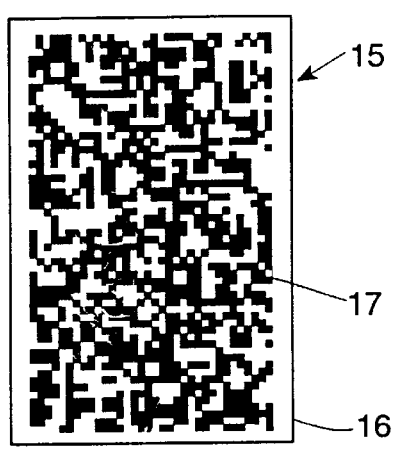
FIG. 2 shows an example of a two-dimensional barcode in accordance with the present invention.

FIG. 2 illustrates an example of the basic PanaMark symbology. PanaMark 15 comprises an encoded set of data bits in a two-dimensional grid. Typically, each data bit which is encoded is printed as a matrix of black or white pixels 17. Preferably, a pixel matrix representing one data bit is square and may be as small as a 1×1 matrix to as large as a 6×6 matrix or more. Non-square matrices can also be used. Preferably, the PanaMark includes the deskewing border 16 which comprises two horizontal and two vertical deskewing strips, which constitute the only non-data portion of the PanaMark. Each deskewing strip is used to ensure that each row and column of the PanaMark is appropriately aligned with each other, as will be discussed in greater detail with reference to FIG. 5. However, sufficient alignment can be achieved with the use of only one deskewing strip and it is possible to obtain acceptable results without the use of any deskewing strips.

The data bits represented by black and white pixels 17 are preferably randomized to ensure an even mix of 0 and 1 bits. Further, the entire PanaMark may be printed using either regular (black) ink or "invisible" ink that is readable only by a suitable scanner, such as an ultraviolet scanner.

Figure 3:
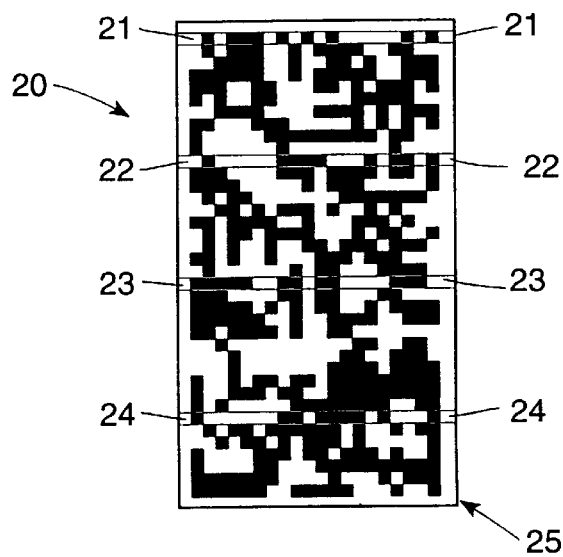
FIG. 3 shows a two-dimensional barcode including rows of block identifiers in accordance with the present invention.

FIG. 3 illustrates a preferred example of a PanaMark 20 having a deskewing border 25 and including rows 21, 22, 23 and 24 of so called block identifiers. These block identifiers may comprise an entire row of data bits, as depicted in FIG. 3, or may comprise only part of a row at specific predetermined locations. Further, block identifiers may be contained in columns of data bits in lieu of or in conjunction with rows of data bits.

As will be described in greater detail with reference to FIG. 4, block identifiers are optionally added at predetermined locations in a PanaMark to permit the number of data bits between each block identifier to be identified. In this manner, it becomes possible to determine whether data bits in the PanaMark are added or missing and to compensate for such errors.

Figure 4:
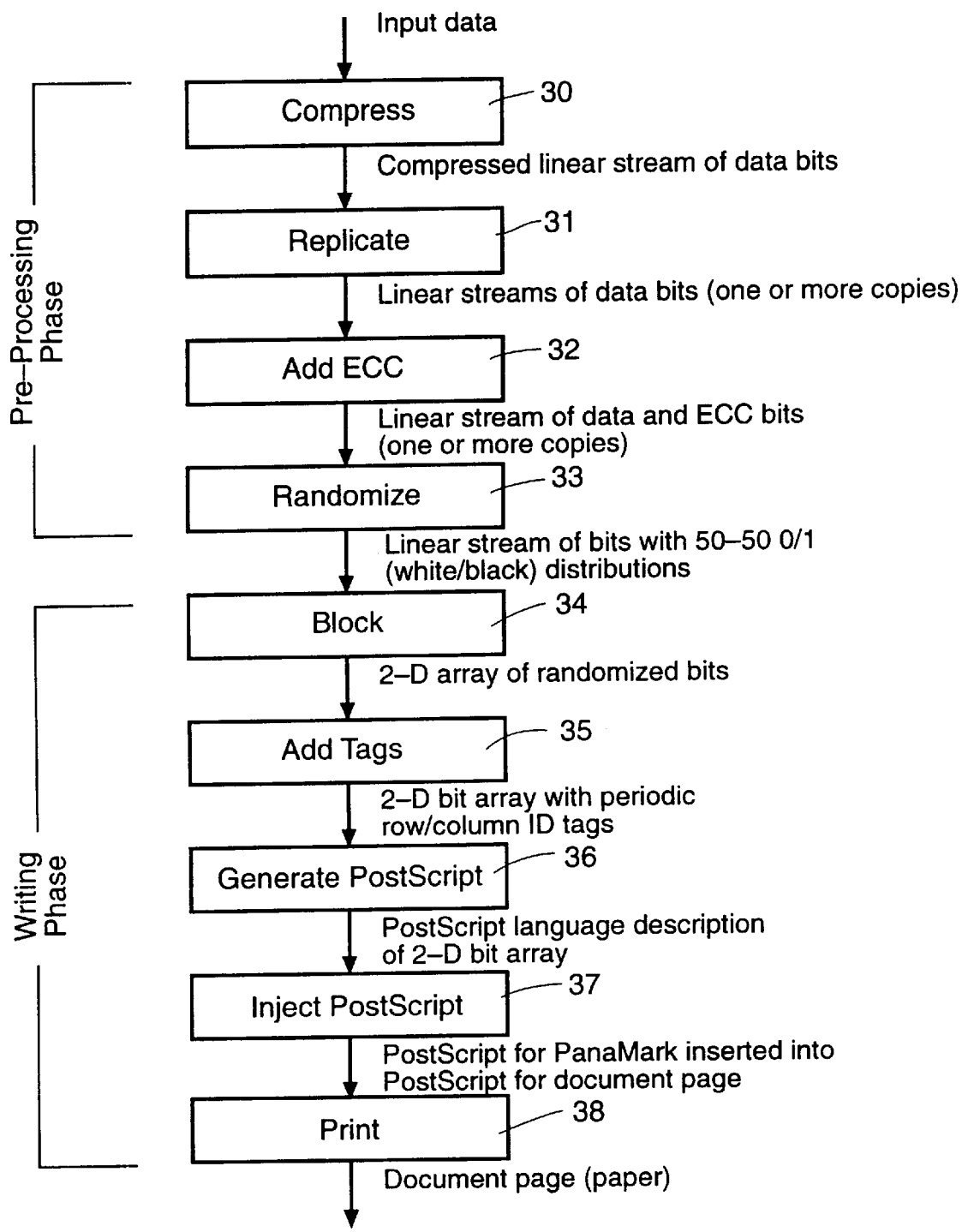
FIG. 4 is a flow chart showing the steps for encoding information onto a printed medium in accordance with the present invention.

FIG. 4 is a flow chart showing the steps for encoding information in the form of a PanaMark onto a printed medium, such as paper. Input data which has been designated for inclusion in the PanaMark is compressed at step 30. Different compression algorithms could be used depending on the nature of the input data (e.g. LZW® for text, JPEG® for graphics). The compression algorithm converts the raw input data (of any type) and produces a character-based or binary compressed data stream. If the compressed data stream is character-based, the data stream is mapped to corresponding binary bits or bytes of digital data comprising 0's and 1's. If the compressed data stream is binary, this step is unnecessary.

At step 31, the binary data stream is replicated a predetermined number of times and preferably combined into a single linear data stream. The degree of redundancy will depend on the intended application, for example, how much real-world damage is to be expected, and the amount of space available for the PanaMark. It should also be appreciated that replicating the data stream is not necessary and is used to improve decoding accuracy through redundancy.

At step 32, error correcting code (ECC) may be added at various locations along the data stream. For example, standard ECC techniques to generate ECC bits for the data may be applied. An example of an ECC algorithm which has provided good results is the binary BCH code. Further, the data in the data stream may be encoded with a cyclic redundancy check (CRC) to detect and to support the correction of errors. The CRC algorithm used may be a standard algorithm such as the "CCITT polynomial". Here again, ECC is not required but is preferably used to achieve greater decoding accuracy.

At step 33, the data in the data stream is preferably randomized to ensure that there are substantially the same number of 0 and 1 bits throughout. The randomization must, of course, be invertible so that the randomized bits may be derandomized during decoding. There are many techniques for performing randomization. For example, the data stream can be randomized bit-by-bit. That is, each data bit in the data stream has an equal chance of being a binary zero or one bit. Another randomization technique would be to apply another layer of compression. Further, any other of a number of well-known cryptographic techniques may be applied as well. Cryptographic techniques have the potentially desirable side effect of securing the data since in order to decode the data, the proper processing key is required. Accordingly, unauthorized decoding of the PanaMark would be prevented. The purpose of randomizing the data bits is to ensure an approximate 50—50% distribution of 0's and 1's which aids in decoding the data in the PanaMark without the use of clocks. This will be further explained in detail hereinafter.

At step 34, the randomized data stream is mapped, or blocked to a two-dimensional array. This step may be performed using a simple row-major-order mapping technique or a more complicated "random" mapping technique, as known in the art. Further, the two-dimensional array may be padded or "bit-stuffed" with random bits to fill out any unused locations. Further, if it is desired to insert block identifiers to the PanaMark, as discussed above, the blocking process leaves vacant certain predetermined locations in the two-dimensional array.

At step 35, block identifiers are inserted into the vacant locations which are used, as discussed previously, to count the number of encoded data bits therebetween for detecting missing or added data rows and/or columns when the PanaMark is read. The vacant locations may be in rows or columns of the two-dimensional array and may or may not encompass an entire row or column.

Next, the two-dimensional digital array is converted into a portable bitmap (PBM) format by adding header information and any necessary control data (for example, skew bars) to the PanaMark at step 36. This PBM is then converted to an Encapsulated PostScript (EPS) using a conventional translator program.

At step 37, the EPS representation of the PanaMark is merged with a PostScript representation of the printed page using a standard merge program. Finally, at step 38, the analog information and the PanaMark is printed on a printed medium via a standard printer of any type.

It should be understood that many of these steps may be interchanged with one another or eliminated altogether. For example, step 33 of randomizing may be performed prior to replicating the data stream or the step of randomizing may be eliminated completely.

Figure 5:
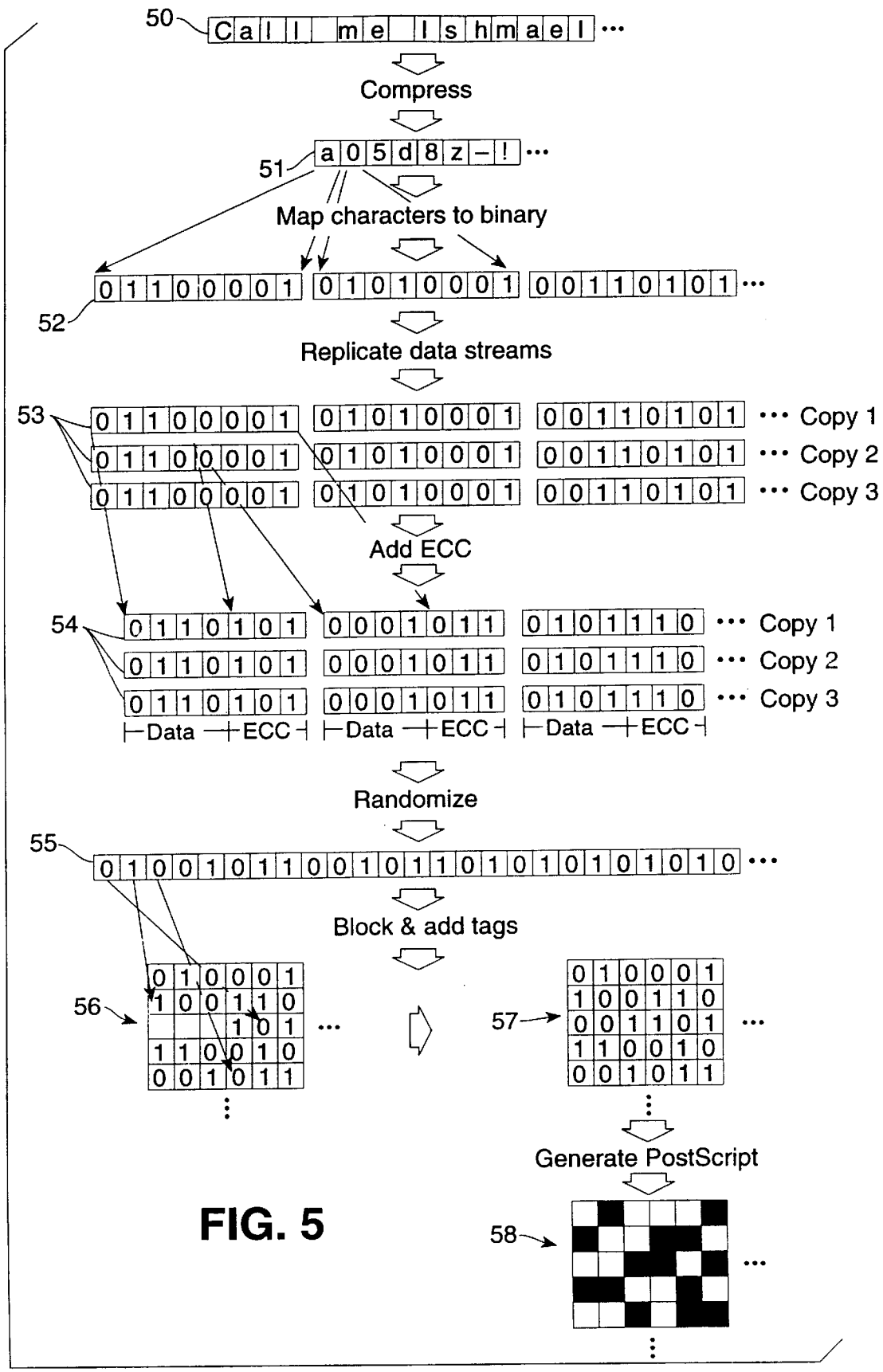
FIG. 5 illustrates some of the steps carried out in accordance with the method set forth in the flow chart of FIG. 4.

A specific example to help illustrate the steps explained in FIG. 4, is given in FIG. 5. At step 50, the phrase "Call me Ishmael" represents the raw input data to be encoded in a PanaMark and printed onto a printed page.

At step 51, the character phrase may be compressed to the representation as shown. Each character is then mapped to its binary representation at step 52.

Step 53 illustrates replicating the data stream of step 52. It should be appreciated that although three data streams are shown, they are preferably one single concurrent data stream. At step 54, it is shown that a three bit ECC is added to every four bits of data. At step 55, bits of the replicated ECC encoded data stream are randomized. At step 56, the randomized linear data stream is mapped to a two-dimensional array by the "random" mapping technique. Random mapping may be preferable to the row-major-order mapping in applications where highly localized damage to parts of the PanaMark is possible. The vacant bit locations are inserted with a block identifier (0 0 1) at step 57. Finally, at step 58 a representation of a portion of the PanaMark is shown.

Figure 6:
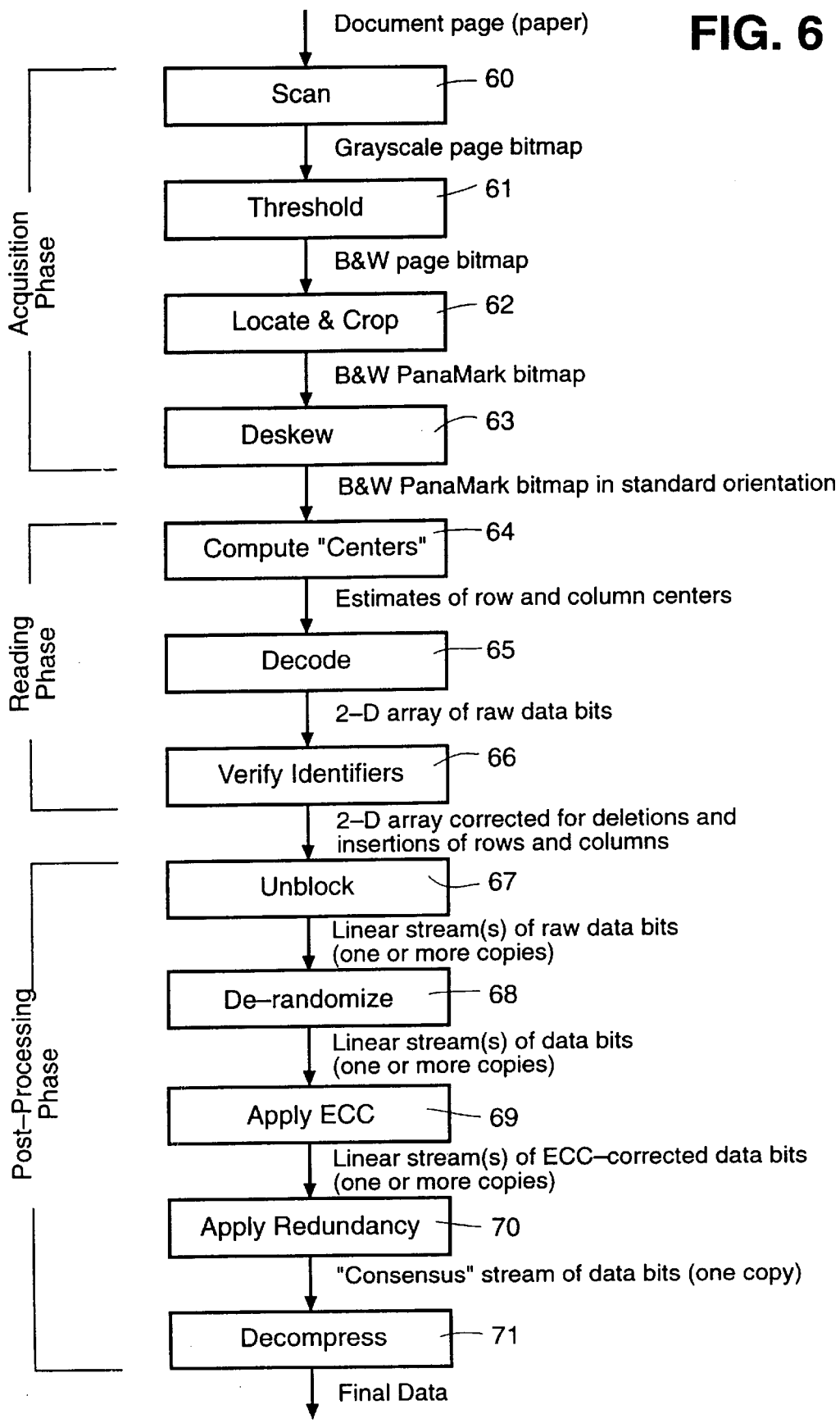
FIG. 6 is a flow chart showing the steps for decoding information printed on a printed medium in accordance with the present invention.

Once information is encoded in the form of a PanaMark and printed onto a printed page, it may be read from the page via the steps shown in FIG. 6. For the purpose of decoding the PanaMark, identification of the mark consists of more than merely finding its location on the printed page. Identification consists of steps 60–63 which include locating the PanaMark and performing image transformations to prepare the PanaMark for decoding.

At step 60, the entire document page is read, for example by a scanner, where both the analog portion and the PanaMark is transferred to an on-line bitmap representation. In particular, this may be done using a flat-bed optical scanner to generate image files in standard 8-bit grayscale (TIFF) format. If, however, the PanaMark has been printed using the so-called "invisible" ink discussed above, an ultraviolet-light scanner would be used to scan the PanaMark.

At step 61, the grayscale image is converted to a binary black-and-white bitmap by thresholding. During thresholding, an intensity level is dynamically selected wherein pixels having an intensity level above the threshold level will be considered a black (or a white) pixel, while pixels having an intensity level below the threshold level conversely will be considered a white (or black) pixel.

Thereafter, at step 62, the PanaMark is located from the bitmap based on various techniques. For example, the size or approximate location of the PanaMark may be stored so that it can be located on the printed document. The PanaMark image is then cropped and the two-dimensional pixel size is determined. Determining the pixel length or width is desirable since, for example, if the PanaMark is found to be 2,615 pixels long and it is known that this corresponds logically to 655 bits, it can be concluded that each bit is approximately 4 pixels long.

At step 63, a correction is made to the PanaMark to compensate for scanning the PanaMark at a slight angle. Basically, the step of deskewing the PanaMark involves unrotating the mark by "sliding" the data bits and the deskewing strips into a position such that the vertical and horizontal deskewing strips are, in fact, vertical and horizontal, respectively. As described above, to perform this deskewing step, only one strip is necessary. This technique may utilize the so called "sheer" algorithm, in which it is assumed that the left-most strip is flush with the edge of the PanaMark for sliding rows of pixels to the left, as needed. Another deskewing technique known as the "rotate" algorithm may be used, which applies the inverse geometric rotation to the image. After the PanaMark is deskewed, the deskewing strips (i.e., the non-data border) are removed from the image.

Now that the PanaMark has been located and enhanced, the PanaMark is ready for decoding at steps 64 and 65. Decoding the PanaMark involves the actual translation of pixels from the scanned image into binary data in the form of a two-dimensional bit array. As such, it is understandably the most important step in the PanaMark reading process. Although in the past, two-dimensional barcodes have been decoded using so-called "clocks" or "clocking bits" as discussed above, the PanaMark uses no such clocking bits, but decodes the information based solely on the data pixels themselves. The decoding takes advantage of the randomness of each data pixel, which results in any given row or column containing roughly an equal number of 0's and 1's. Thus, there are many white-to-black and black-to-white transitions, hereinafter referred to as "edges", throughout the mark. These edges are used to calculate row and column "centers" at step 64. The row and column centers are then utilized to determine where to read out each data bit at step 65. This clock-free decoding technique could also work if the data has not been randomized; however, it is likely to be less effective. Details of steps 64 and 65 will be discussed in greater detail with reference to FIGS. 8–12 below.

At step 66, the binary data has been read out of the PanaMark and the block identifiers, if any, are located. It is then verified, based on the number of encoded data bits or the number of rows and/or columns between each located block identifier, whether rows/columns of data have been deleted or added. If they have, added or missing rows/columns will be compensated for as will be described with reference to FIGS. 10–12.

After the integrity of the two-dimensional bit array has been confirmed, the binary data bits are unblocked, at step 67, forming a linear data stream. Then at step 68, the inverse randomization process is applied. At step 69, the binary data bits are passed through a standard ECC procedure to eliminate errors, as known in the art. After the ECC procedure, the redundant data streams, if any, are used to form a "consensus" data stream at step 70. For example, if there are three redundant data streams, majority voting may be applied, so if two of the data streams represent that the value of a particular data character is "C" while the third data stream represents that the value is "Q," the majority wins and the output will be "C." Finally, at step 71, the stream is decompressed, yielding the original raw input data.

Figure 7A:
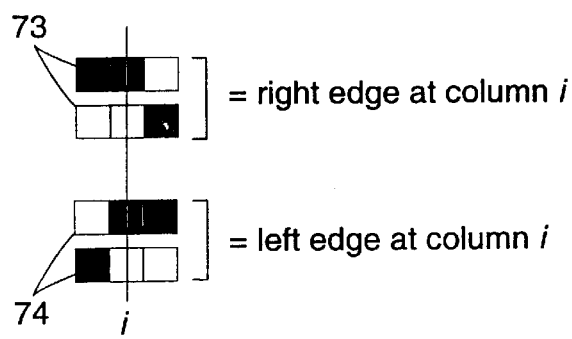
FIGS. 7A and 7B illustrate respectively how a horizontal edge and a vertical edge is determined in the scanned barcode in accordance with the present invention.
Figure 7B:
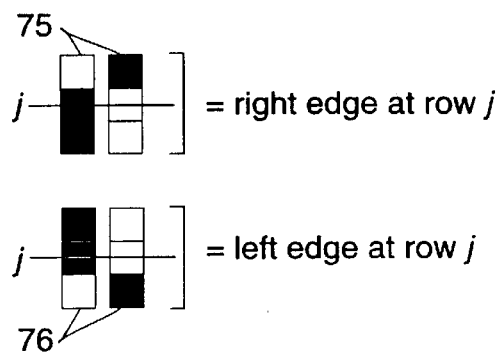

The technique of decoding the PanaMark will now be discussed with reference to FIGS. 7–9. To decode the PanaMark without the use of clocking bits, all of the horizontal "edges" for each column and all of the vertical "edges" for each row are counted, respectively. An edge is defined as two neighboring pixels of the same color adjacent to a pixel of a different color. The four different types of horizontal edges are shown by reference numerals 73 and 74 of FIG. 7A. Similarly, the four different types of vertical edges are shown by reference numerals 75 and 76 of FIG. 7B. Whether a horizontal edge is considered a right edge 73 or a left edge 74 is of no consequence when used to decode the PanaMark. However, if the number of horizontal right edges and horizontal left edges are previously known, and if a different number is counted, then an error will be detected. The same may be said of vertical top edge 75 and vertical bottom edge 76.

Figure 8:
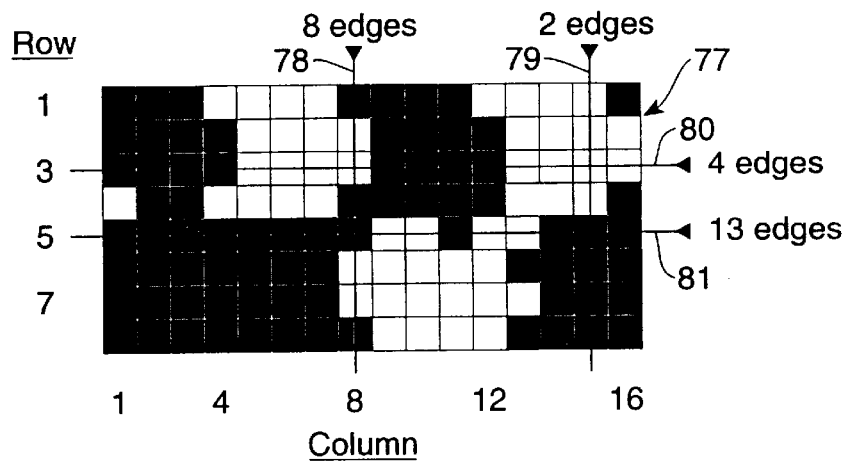
FIG. 8 illustrates how horizontal and vertical edges are counted in each row and column, respectively, in accordance with the present invention.

FIG. 8 illustrates how horizontal and vertical edges are counted in each column and row, respectively, to determine column center lines and row center lines. In general, columns and rows corresponding to column and row center lines have far fewer edges than those corresponding to non-centers. Column and row center lines are used to determine the center pixel of a pixel matrix representing a binary data bit to be read out. The center pixel is read to give the most accurate data, as opposed to the surrounding side pixels of the matrix. In other words, in the case where a single data bit is represented by a 3×3 block of pixels, the center pixel of the data bits is the most desirable place to read out the binary data. Conversely, the pixels surrounding the center pixel have a far greater chance of being erroneous, due to noise caused by random pixel errors and the like. Accordingly, determining the locations in each column and row having the least number of edges will accurately locate each center pixel, thus producing the most reliable binary data when that pixel is read out.

FIG. 8 illustrates how vertical and horizontal edges are counted in a portion of a PanaMark. For example, scanline 80 is used to count the number of vertical edges contained in row 3. As shown, row 3 has four vertical edges. Similarly, row 5 has thirteen vertical edges counted along scanline 81. With respect to horizontal edge counting, column 8 includes eight horizontal edges along scanline 78, while column 15 includes two horizontal edges along scanline 79. Of course, each row and column will be scanned so that the number of edges will be determined for every row and column.

Figure 9A:
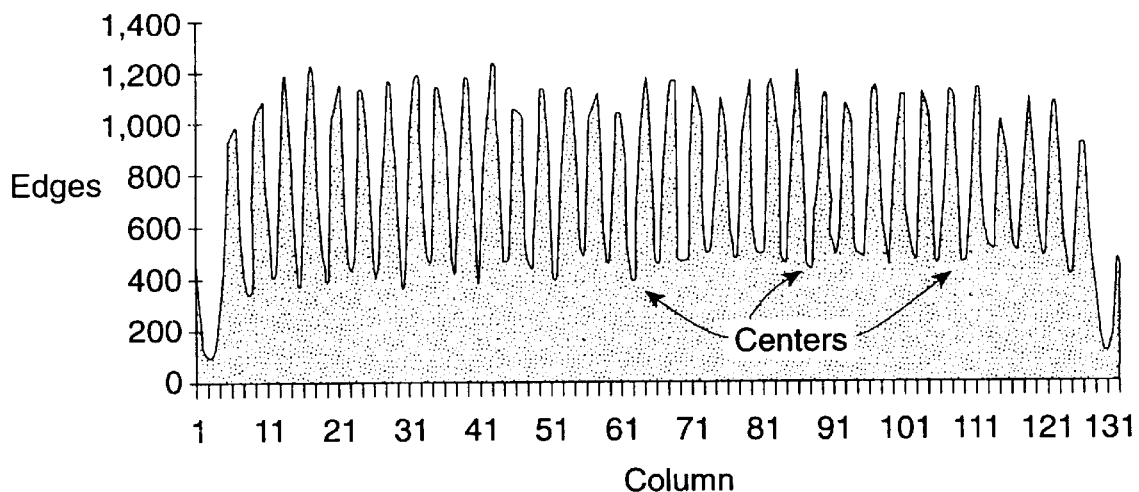

FIG. 9A represents per-column horizontal edge counts for the entire width of a PanaMark having 134 pixel columns. As indicated, wherever there is a local minima, it is determined that the column has a column center line. Similarly, FIG. 9B represents the per-row vertical edge count for the partial length (the first 134 rows) of a PanaMark that goes down the majority of a printed page as seen in PanaMarks 14 of FIG. 1. Here also, the local minimas depicting row center lines are well defined.

In operation, the computer system need not actually graphically produce the column and row centers as shown in FIGS. 9A and 9B, respectively. Instead, a one-dimensional linear representation for each row and column, respectively, is computed to determine the local minimas. This can be done very accurately since the computer has an estimation of how far each row and column center should be apart. For example, in a binary data bit represented by a 3×3 pixel matrix, it is known that approximately every three pixel rows and every three pixel columns there should be a new row and column center line, respectively. However, the center lines are so well defined, it is not required that the computer know the approximate spacing of the center lines.

Once the horizontal and vertical edges are counted and each column and row center line determined, the binary data which is located at the intersection of the column and row center lines is sequentially read out to form a two-dimensional array of data bits. For example, as illustrated in FIG. 9A, column 31 has a column center line. Thus, for every row center line, as illustrated in FIG. 9B (row 9, 13, 16 . . . ), the binary data will be read out where each row center line (9, 13, 16 . . . ) intersects column center line 31.

Once the two-dimensional array of data bits is produced, block identifiers, if any, are identified as described in step 66 of FIG. 6. The advantage of inserting block identifiers into the PanaMark during the encoding stage should be evident. It is easy to imagine circumstances in which the binary data in a PanaMark cannot be decoded reliably. Suppose, for example, the majority of the PanaMark is covered or missing, or even merely a small section of the PanaMark is covered. In this case, even though whatever data that is present may be directly decoded, and it may not be possible to make use of the decoded data due to not knowing where it belongs with respect to the missing data. A more subtle effect occurs when faxing a PanaMark. It has been observed that a facsimile machine scanner causes variable distortion across data barcodes. As such, it is conceivable that a PanaMark which has been transmitted via a facsimile machine may have some distortion across a row of pixels causing missing or extra rows of pixels to appear. FIG. 10A illustrates PanaMark 82 where a row of pixels 83 is compressed such that when the PanaMark is decoded, the compressed row of pixels will be skipped. FIG. 10B illustrates PanaMark 84 where a row of pixels 86 that has been expanded to approximately twice its size. Accordingly, when PanaMark 84 is decoded, the expanded row will be represented more than once in the output. This may lead to an entire row or rows of data bits which are lost or duplicated. Of course, the same effect may occur in the columns of the PanaMark.

Accordingly, the insertion of block identifiers, each having a known predetermined bit sequence or value, into predetermined vacant locations of the digital two-dimensional array, as depicted in steps 56 and 57 of FIG. 5, is desirable. The block identifiers can occupy an entire row or column and be separated by a known number of rows or columns of data bits. Alternatively, the block identifiers can be a predetermined number of bits being separated by a predetermined number of data bits. During decoding, after the binary data bits have been read out to a two-dimensional bit array, the block identifiers are first located and then preferably, the number of rows and/or columns between each block identifier are counted to determine whether there are added or missing rows. Alternatively, the number of data bits between block identifiers is counted to determine whether to add or delete data bits. If rows and/or columns or data bits are missing, it must then be determined where to add data to compensate for the errors.

FIG. 11 illustrates the preferred search order for determining the location of a block identifier. Since errors are as likely to occur within the bits representing the block identifiers as anywhere else, the block identifier algorithm does not search for an exact match with the predetermined value. Instead, the line with the minimum hamming distance to each predetermined bit sequence is identified as the line containing the block identifier. Of course, other techniques besides hamming-distance comparison may be used.

FIG. 11 shows a portion of PanaMark 90 having a series of rows 91, 92, 93, 94, 95 of data bits in which one row has a block identifier which has a predetermined bit sequence. To locate the block identifier, if for example, it is known that each block identifier has been inserted after every eight rows of encoded data bits, it is assumed that the row having the block identifier bits will be every nine rows unless there has been some distortion. Accordingly, the row having the expected block identifier (row 91 of FIG. 11) is first compared to the predetermined bit sequence. If there is not an exact match, row 92 is compared to the bit sequence. The remaining search order is further indicated in FIG. 11, i.e. row 93, 94 and 95. If there is not an exact match in any of the rows, then the row having the minimum hamming distance from the predetermined bit sequence will be determined to be the block identifier row. Of course, although the block identifier is shown to be in a row of data bits, the block identifier may also be located in columns of the bit array. Further, the exact locations of each block identifier within a row or column may be known, so the known row or column is first compared to the predetermined bit sequence, as described above.

Once all of the block identifiers are located, it can be determined whether alignment needs to be performed. If the number of rows between each block identifier contain the correct predetermined number, no alignment is necessary. If, however, it contains too few rows, alignment is necessary to add additional rows. If it contains too many lines, alignment is necessary to delete surplus rows.

If it has been determined that a row of encoded data bits should be deleted, i.e., the number of actual rows of encoded data bits exceeds the predetermined number, then it is assumed that if there are two adjacent rows having identical binary data, one row is to be deleted. If there are no two adjacent identical rows, then one of the two adjacent rows having the minimum hamming distance from one another will be deleted.

However, if it has been determined that the number of rows of encoded binary data is less than the predetermined number, for example, one row is missing, then it is necessary to add a row of binary data. This leaves the question of what data to insert and where to insert such data. As to what data to insert, random data can be used as a "place holder" in the absence of a more informed choice. Since the original encoded data is randomized, any choice of the number 0's and/or 1's for the inserted row will yield an expected accuracy rate of 50%. While the inserted row will contain a relatively large number of errors on average, the correct number of rows between each block identifier will be achieved and an ECC and or data redundancy may correct any errors that will arise.

FIG. 12 illustrates the procedure for determining where to insert a row of random binary data in PanaMark 100 if a row was determined missing. The preferred procedure looks at each determined row center line, eg. row center line 101 between two successive block identifiers, as indicated by the arrow 105 in FIG. 12. In row center line 101, all pixels are marked with an "X." Next, each pixel in row 102 above and row 103 below row center line 101 is compared with its adjacent row center line pixel. In these rows 102 and 103, a pixel is marked with an "X" to indicate that the pixel is of the same color (i.e. "connected") to row center line 101. Finally, the row having the least number of "X"'s, i.e. the most "disconnected" pixels, is determined to be inappropriately adjacent to the row center line and the added row of random data will be inserted therebetween. Using this technique, row 102 contains three disconnected pixels (as opposed to only two disconnected pixels of row 103) and thus is chosen to be the erroneously adjacent row. Accordingly, a row of random data will be added between row 102 and center row line 101.

While the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. A method of encoding information for printing on a printed medium for later decoding without the use of clocking bits and without the use of a border, comprising the steps of:

converting said information into a data stream having a sequence of "0" and "1" characters representing data bits;

randomizing said data stream to produce a randomized data stream having a sequence of "0" and "1" characters;

formatting the randomized data stream into a two-dimensional bitmap of rows and columns including only the randomized data stream bits; and printing the formatted bitmap onto said printed medium.

2. The method as in claim 1, further comprising the step of compressing said information.

3. The method as in claim 2, further comprising the step of adding error correction code data bits to said data stream.

4. The method as in claim 3, further comprising the step of duplicating said data stream to produce redundant data for improving reliability upon encoding.

5. The method as in claim 4, wherein the step of formatting includes adding header information to said data stream to produce a standard portable bitmap (PBM) format.

6. The method as in claim 5, wherein the step of formatting includes adding one horizontal or one vertical deskewing strip having a length approximately equal to the row or column length, respectively.

7. The method as in claim 6, wherein the step of formatting further includes converting said PBM format to Encapsulated Postscript.

8. The method as in claim 1, wherein said step of randomizing said data stream randomizes the stream bit-by-bit.

9. A computer-readable information storage medium having encoded thereon a two-dimensional data barcode comprising a bitmap formatted representation of digital encoded information having a selected pixel row and column length, and having a plurality of block identifiers, each having a predetermined value and each positioned at a predetermined location such that each block identifier being spaced a predetermined number of rows or columns apart to permit automatic correction of said encoded information decoded from said barcode if, in the decoded information, the number of rows or columns between two sequential block identifiers does not equal said predetermined number.

10. A computer-readable information storage medium having encoded thereon a two-dimensional data barcode comprising a bitmap formatted representation of randomized encoded information having a selected pixel row and column length, and having a plurality of block identifiers, each having a predetermined value and each positioned at a predetermined location such that each block identifier being spaced a predetermined number of rows or columns apart to permit automatic correction of said encoded information decoded from said barcode if, in the decoded information, the number of rows or columns between two sequential block identifiers does not equal said predetermined number.

11. The computer-readable information storage medium as in one of claims 9–10, further comprising at least one horizontal or vertical deskewing strip having a length approximately equal to the row or column length, respectively.

12. The computer-readable information storage medium as in claim 10, wherein said randomized encoded information being randomized bit-by-bit.

* * * * *